Figure 1:
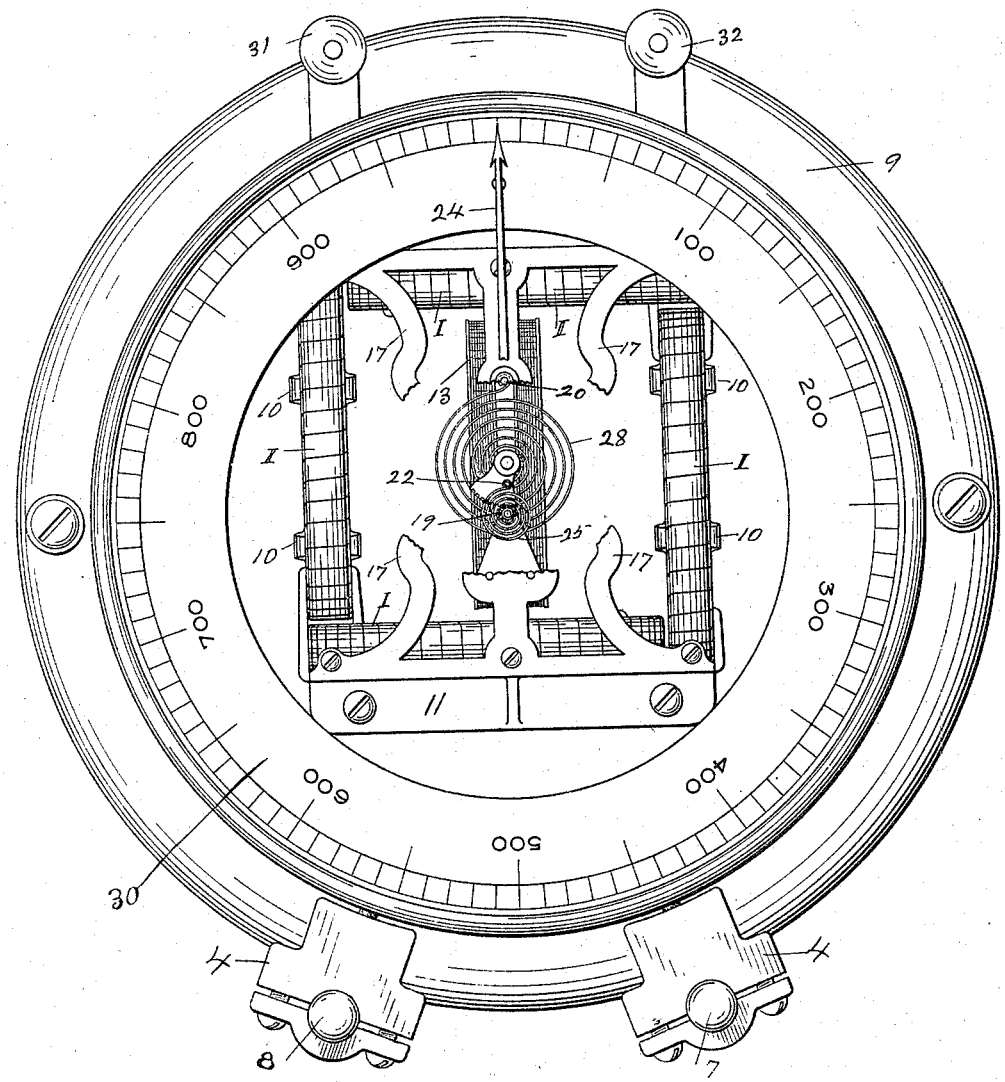

(No Model.) 5 Sheets—Sheet 1.
T. DUNCAN.
ELECTRICAL INDICATING WATTMETER.

No. 580,384. Patented Apr. 13, 1897.

Witnesses
Lewis P. Abell.
C. M. Chambers.

Thomas Duncan Inventor
By his Attorneys Chapin & Denny (No Model.)

T. DUNCAN.
ELECTRICAL INDICATING WATTMETER.

No. 580,384. Patented Apr. 13, 1897.

Witnesses
Lewis Labell
C. M. Chambers.

Thomas Duncan Inventor
By his Attorneys Chapin & Denny (No Model.)  5 Sheets—Sheet 5.

T. DUNCAN.
ELECTRICAL INDICATING WATTMETER.

No. 580,384. Patented Apr. 13, 1897.

Witnesses
Lewis A. Bell.
C. M. Chambers.

Thomas Duncan Inventor
By his Attorneys Chapin & Denny

UNITED STATES PATENT OFFICE.

THOMAS DUNCAN, OF FORT WAYNE, INDIANA.

ELECTRICAL INDICATING WATTMETER.

SPECIFICATION forming part of Letters Patent No. 580,384, dated April 13, 1897.

Application filed December 3, 1896. Serial No. 614,272. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electrical Indicating Wattmeters; and I do hereby declare that the following is a full, clear, and exact description of the invention, which will enable others skilled in the art to which it appertains to make and use the same, reference being had to the accompanying drawings, which form part of this specification.

My invention relates to improvements in electrical indicating wattmeters specially designed and adapted to be employed in laboratories and central or distributing stations.

It is well known that the common method of securing a record of the power or energy delivered from the central station to the lighting or power circuits by making a record of the readings of the current in amperes and then multiplying such readings by the electromotive force in volts is far more inconvenient and unreliable than a method of direct reading of the actual watts or power distributed. It is also well known that while the product of the amperes and volts is a practically true record of the electric energy distributed in a direct-current system of distribution it is not so in alternating-current systems of distribution for the reason that in the latter systems the angle of lag becomes an important factor.

In alternating-current systems of distribution the power in watts is equal to the product of the amperes, the electromotive force in volts, and the cosine of the angle of lag, which is very much less than would be the amount of energy were the last-named factor omitted, as the following will show: Suppose the pressure of a current utilized by a motor or other inductive translating device which causes the current to lag behind the electromotive force, say forty-five degrees, is one hundred volts and the meter reads fifty amperes. The actual power or watts delivered would be one hundred multiplied by fifty multiplied by the cosine of forty-five or .7071, which equals 3535.5, the actual watts, which amount is just forty-one per cent. less than the amount would have been had the factor of the angle of lag been omitted.

The object, therefore, of my invention is to provide an improved meter adapted for use in both direct and alternating current systems of distribution which will indicate directly the actual or real watts with unerring accuracy; having a multipolar arrangement of its field-coils to secure a strong and effectual field; provided with an annular instead of the usual quadrant scale or dial, thereby greatly increasing its range and facilitating the reading thereof; constructed and arranged to occasion the least possible friction, and adapted to be dead-beat in its indications.

The novel features of my improved meter are illustrated in the accompanying drawings, in which similar reference-numerals indicate corresponding parts throughout the several views, in which—

Figure 2:
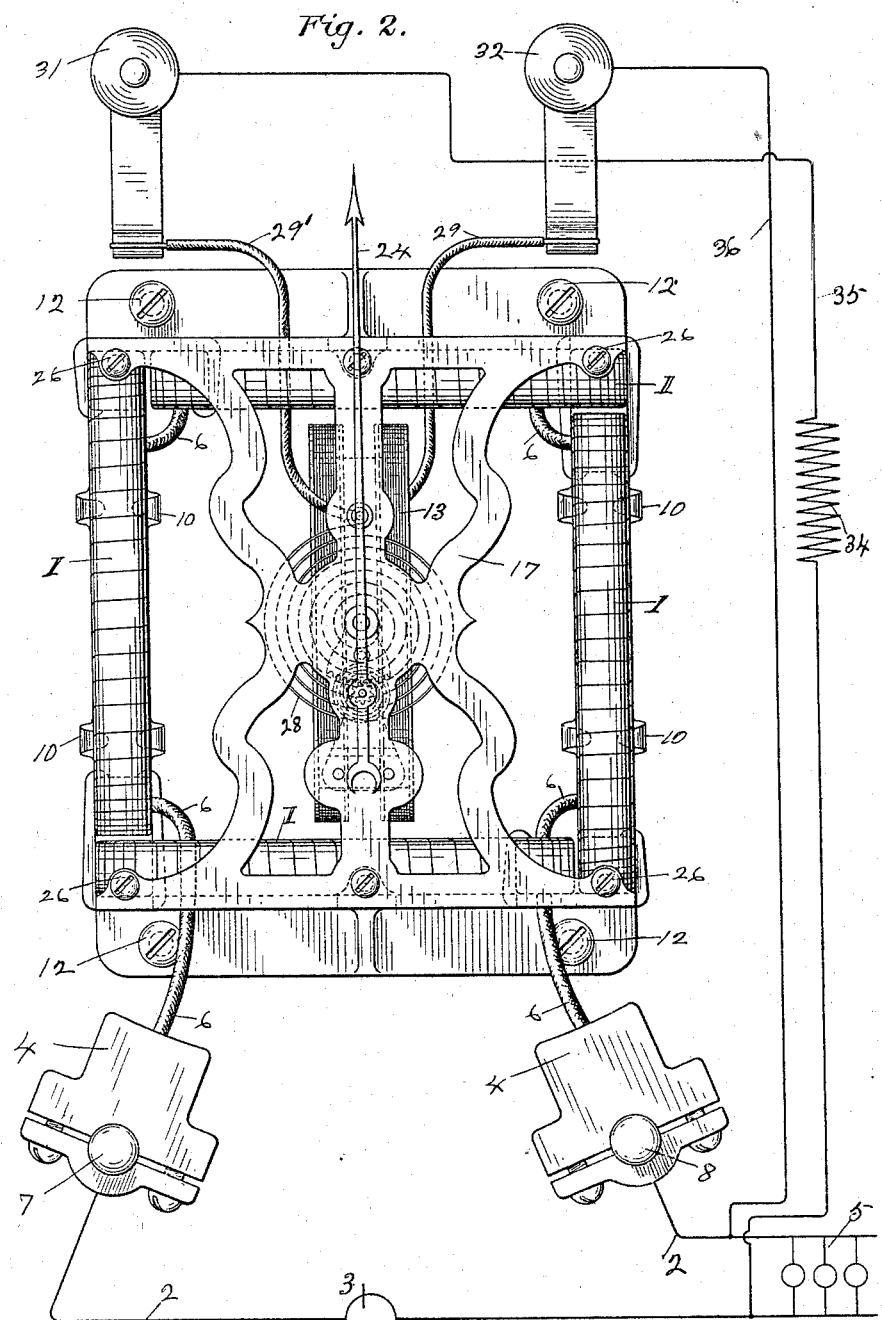
Figure 3:
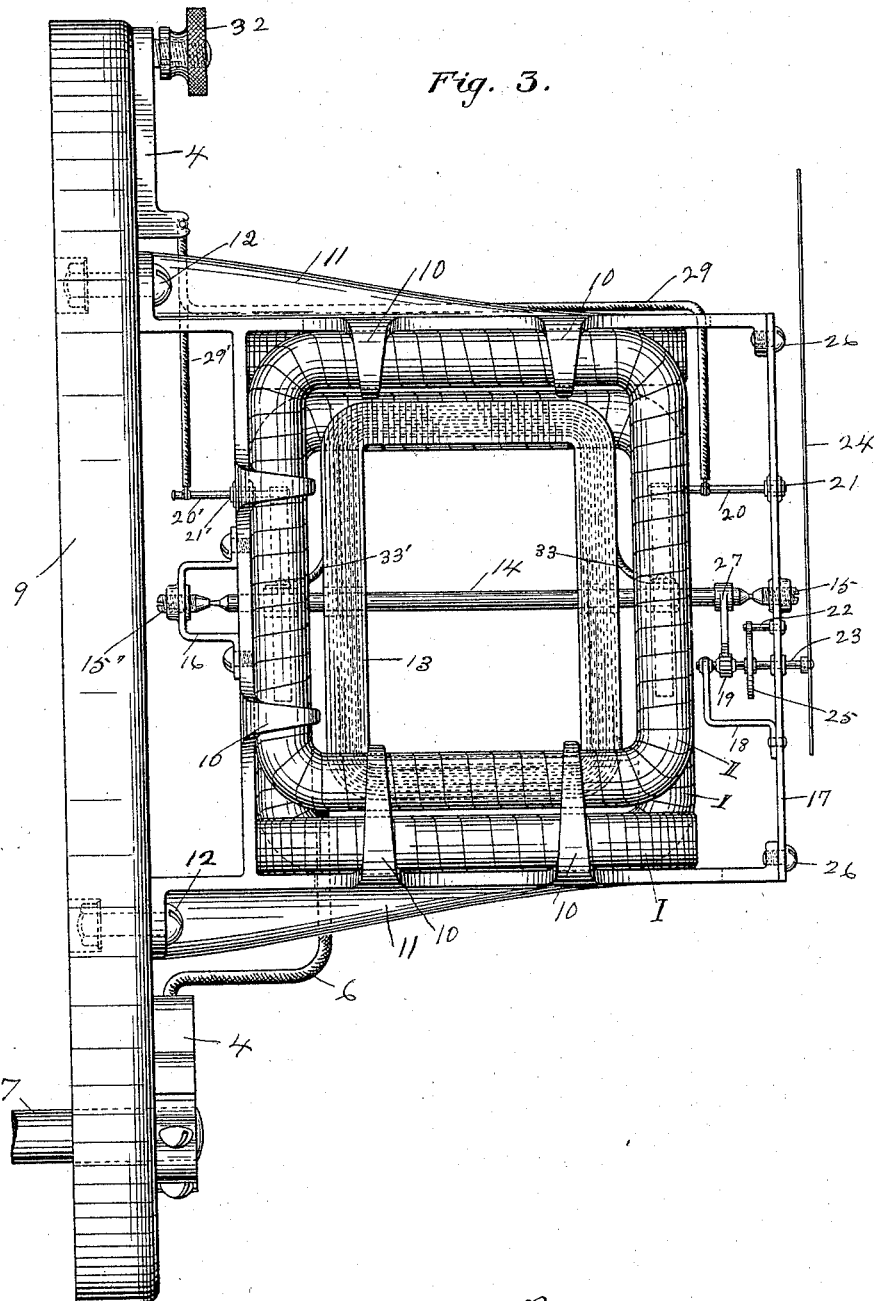
Figure 4:
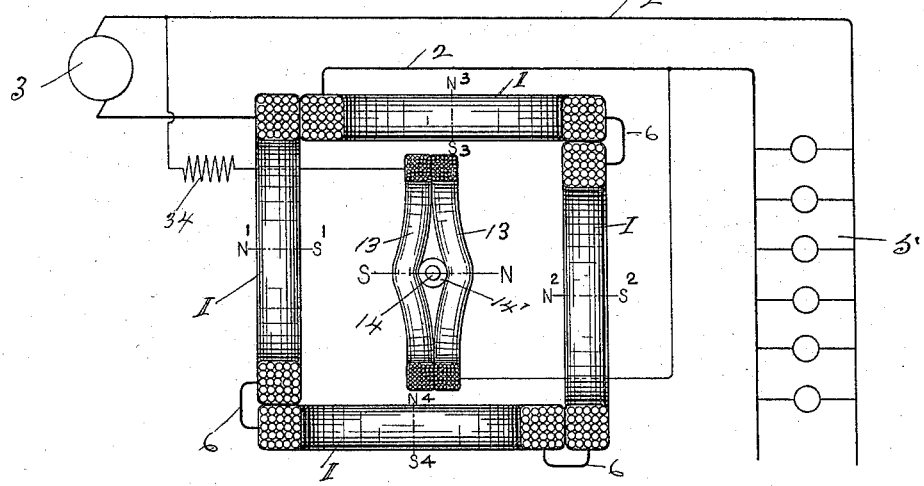
Figure 5:
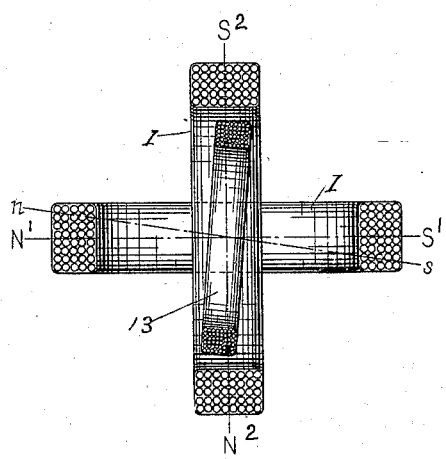
Figure 6:
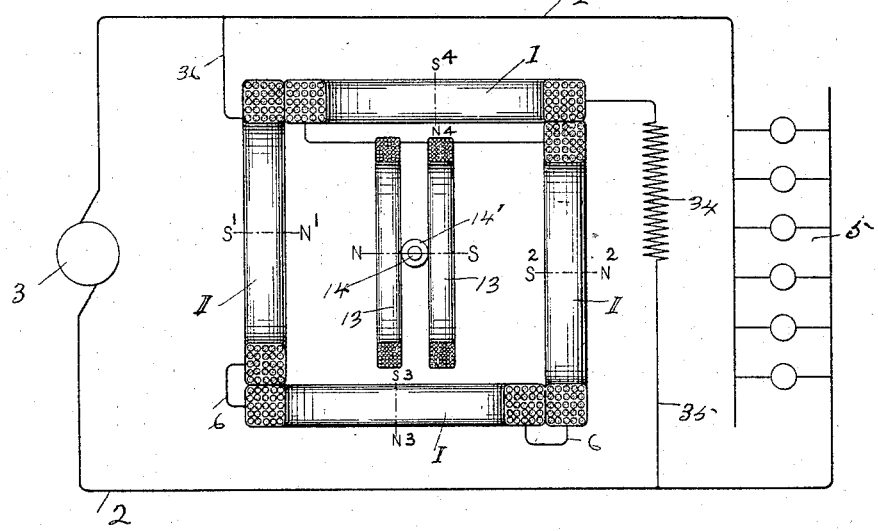
Figure 7:
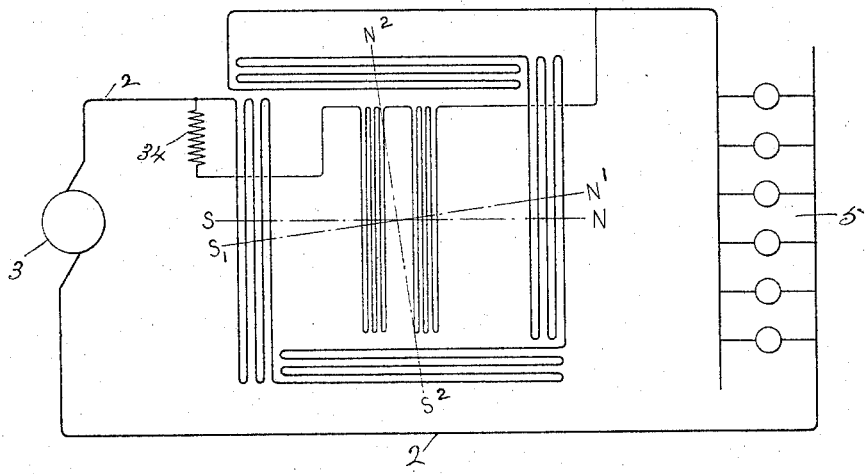

Figure 1 is a front view in elevation of my improvement with the central portion of the face-plate cut away to show the relative arrangement of the helical springs. Fig. 2 is a similar view of the same with the face-plate entire with the base and dial removed to show the operating connections therefor. Fig. 3 is a side elevation showing the manner of supporting the multipolar field-coils and the spindle carrying the volt-coil. Fig. 4 is a detail of the field and volt coils in vertical section. Fig. 5 is a modified arrangement of the field and volt coils shown in transverse section. Fig. 6 is a detail view of the field and volt coils in transverse section, showing the connections for indicating the pressure when used as a volt-meter. Fig. 7 is a diagrammatic view of the resultant position taken by the magnet lines or axes of the multipolar field-coils relative to that of the volt-coil.

The series or field-coils 1 are approximately rectangular in form and four in number, and are so arranged that the opposite sides of each coil are contiguous or in close proximity to the adjacent sides of the remaining coils, and the outline of the inclosed space being in the form of a rectangular parallelogram, Figs. 1 and 4, thereby forming two magnetic axes, the axes of the opposite coils will be out of alinement for the purpose of actuating the volt-coil in the manner hereinafter described. The said coils 1 are connected into the main circuit 2 and with the source of supply 3 by means of the plugs 7 and 8, at the terminals or binding-posts 4, and the short connecting-cables 6, Fig. 2, whereby all the current received by the translating devices or lamp-board 5 must first pass through the said coils 1.

To the outer face of the supporting-block 9, of marble, slate, or other proper insulating material, is rigidly secured the metallic bracket 11, Fig. 3, having a plurality of integral lateral clamps or claws 10 on its vertical portion and also on its forwardly-projecting arms, adapted to embrace and rigidly secure the field-coils. The said bracket 11 is detachably secured to the supporting-block 9 by means of proper holding-screws 12. The two-part volt-coil 13 is vertically arranged within the said field-coils 1 midway the sides thereof, and is rigidly mounted upon and supported by the horizontal spindle 14, Fig. 4, and may have its parts in parallel arrangement, as shown in Figs. 2 and 6, or the said parts may have their upper and lower sides in contact and their vertical sides laterally spread midway the horizontal shaft or spindle 14, with its bushing 14', as shown in Fig. 4. To the forward end of the arms of the said bracket 11 is rigidly secured, by means of proper holding-screws 26, the irregular face-plate 17, Fig. 2, stamped from one piece of metal. In the central portion of this plate is rigidly fixed a jeweled screw-support 15, adapted to form a bearing for the forward end of the said spindle 14, Fig. 3. At a suitable point upon the rear face of the said bracket 11 is rigidly secured by proper holding-screws the metallic bracket 16, in which is properly secured the jeweled screw-support 15', forming a bearing for the rear end of the said spindle 14. At or near the forward end of the said spindle 14 is rigidly fixed or secured a toothed quadrant-sector 27.

In a proper bearing in the plate 17 is rotatably mounted the short shaft 23, carrying upon its outer end the index-pointer 24, adapted to traverse the annular dial 30. The inner end of the said shaft 23 is loosely mounted in a proper bearing in the upper end of the supporting-bracket 18, rigidly fixed in any proper manner upon the inner face of said plate 17. Near the inner end of said shaft 23 is rigidly mounted a pinion 19, adapted for an actuating engagement with the said quadrant-sector or sector-wheel 27.

The small helical spring 25 has its inner end secured to the central portion of the shaft 23, is coiled about said shaft, and has its outer end secured to the pin 22, fixed in said plate 17. The function of the spring 25 is to prevent any vibration or lost motion in either the shaft 23, the said pinion 19, or the index-pointer 24.

At suitable points on the shaft or spindle 14, near the extremities thereof and properly insulated therefrom, the inner end of the larger helical springs 28 are fixed. The said springs are then coiled about said spindle, as shown, and have their outer ends secured to the inner ends of the respective brass rods 20 and 20', Fig. 3, the former having its outer end rigidly secured in the said plate 17 and insulated therefrom by a proper insulating-bushing 21, and the latter being rigidly fixed near the middle of its length in the vertical face of the said supporting-bracket 11 and is insulated therefrom by a proper insulating-bushing 21'. The said springs 28 are coiled about the spindle 14 in opposite directions, so that they exert their tension in opposite directions and thus neutralize the effect one of the other in resisting the oscillatory or rotary movement of the said spindle 14. The function of the said springs 28 is to promptly return the said shaft and volt-coil to their normal position when not actuated by the current in the field-coils, and also to form a proper electrical connection between the said rods 20 and 20' and the said volt-coil. The said rod 20 is electrically connected to the binding-post 32 by the wire or cable 29, and the said rod 20' is similarly connected to the binding-post 31 by the wire 29'. The inner ends of the said springs 28 are electrically connected to the volt-coil terminals 33 and 33', while the outer ends of said springs are in contact with the said conducting-rods 20 and 20', as above described.

The dial 30 reads in watts from "0" to "1000," but may be graduated to read in any capacity in kilowatts or direct in horse-power.

The operation of improved wattmeter thus described is, briefly stated, as follows: The electric current is supplied to the volt-coil 13 from the main circuit as follows: From the binding-post 31 the current passes through the wire 29' to the brass rod 20', insulated from its supporting-bracket 11, as described, and thence through the rear helical spring 28 to the said volt-coil 13 through the terminal 33', thence through the volt-coil to the forward spring 28 through the terminal 33, thence to the binding-post 32 through the rod 20 and the wire 29, Fig. 3. The traversing of the said field-coils by the electric current sets up or establishes a corresponding number of magnetic fields, as represented by the respective magnetic poles $N'$ $S'$, $N^2$ $S^2$, $N^3$ $S^3$, $N^4$ $S^4$ in Fig. 4. The traversing of the said volt-coil by the current, as above described, establishes a field N S, Fig. 4. As the said volt-coil is rigidly mounted and supported upon the spindle 14 it is free to rotate with said spindle in its bearings 15 and 15' under the influence of the said magnetic poles, as follows: The pole N of the said volt-coil will be repelled from the pole $N^2$ of the series coil and attracted by the pole $S^3$, while the pole S of the volt-coil will be repelled from the pole $S'$ of the series coils and attracted by the pole $N^4$, which will obviously cause the said volt-coil to move on its axes in the direction contrary to that of the hands of a clock. As this motion of the said volt-coil will not exceed ninety degrees, its indications are made to extend through an entire circle in the following manner: As the index-pointer 24 is fixed upon the forward projecting end of the rotatable shaft 23 and the rigid pinion 19 on said shaft is in mesh with the rigid sector-wheel on the spindle 14, on which the said volt-coil is fixed, it is obvious that if the said sector-wheel and said pinion be provided with an equal number of teeth one oscillation of the said volt-coil through an arc of ninety degrees will produce a complete revolution of said pointer upon the dial or scale 30. All vibration in the pointer 24 is obviated by the helical spring 25 on the same shaft therewith.

As the strength of field developed in the series coils varies with the current flowing through them, and the field developed in the volt-coil is also dependent upon its current and varies with the electromotive force at its terminals, it follows that the mutual attraction and repulsion between the coils, as above described, is proportional to the product of their respective strengths or watts.

In calibrating an inductive resistance 34 is used to adjust the torque and current of the volt-coil. In Fig. 5 is shown a right-angular arrangement of a single pair of coils for the series field so placed as to produce two magnetic axes at right angles to each other, as described. In the arrangement shown in Fig. 5 it is necessary to give the volt-coil an initial tilt, as shown, to avoid the parallelism of the axes N S and N' S'.

The only difference between that form of my improvement shown in Figs. 4 and 6 is that the form shown in Fig. 6 is a volt-meter and has its field-coils and volt-coil in series. In Fig. 7 is shown diagramatically the probable action of the instrument. Assuming that each opposite pair of field-coils add their magneto-motive forces and flux, as shown, the resultant action is the same as if they had set up independent fields, as shown in Figs. 4 and 6. In the former case the upper and lower field-coils will give the magnetic axis $N^2 S^2$ and those at the sides the axis N' S', Fig. 7. The volt-coil axis N S will be repelled by the axis N' S' and attracted by the axis $S^2 N^2$—that is, the pole N will be repelled from N' and attracted by the pole $S^2$—all of which is old and well known.

What I claim as my invention, and desire to secure by Letters Patent, is—

1. In a wattmeter of the class described, the combination of a plurality of field-coils so arranged that their magnetic axes cross each other at right angles, and the magnetic axes of the diametric coils are out of alinement with each other and also with the axis of the inclosed volt-coil for the purpose specified; and the vertically-arranged volt-coil 13 rigidly fixed upon a horizontal shaft as shown within said field-coils, and adapted to be actuated by the magnetic axes of said field-coils, all substantially as described.

2. The combination in a wattmeter, of the field-coils 1 arranged as shown, with their diametric axes out of alinement with each other and with the magnetic axis of the volt-coil, for the purpose described; the volt-coil 13 mounted as described on the spindle 14 and adapted to be actuated by said field-coils; the horizontally-arranged spindle 14 revolubly mounted in suitable bearings and carrying said volt-coil; a sector-wheel rigidly fixed upon the outer end of said spindle adapted to actuate a counter-shaft carrying an index-pointer; the shaft 23 rotatably mounted in the face-plate as described, carrying upon its inner end a fixed pinion in mesh with said sector-wheel; a helical spring 25 mounted upon said shaft as shown for the purpose specified; and the pointer 24 adapted to traverse the said dial, all substantially as described.

3. In an electrical indicating wattmeter, the combination of a plurality of field-coils whose magnetic axes cut each other at right angles, as shown, and a volt-coil pivotally mounted therein and having its magnetic axis at right angles to one of the magnetic axes of the said field-coils and adapted to be actuated by said field-coils, all substantially as described.

4. In an electrical indicating wattmeter, the combination of a plurality of field-coils arranged in the form of a parallelogram, and having the magnetic axes of the opposite coils out of alinement, whereby an inclosed pivotally-mounted volt-coil will be oscillated or actuated by the said field-coils, as and for the purpose described.

Signed by me, at Fort Wayne, Allen county, State of Indiana, this 1st day of December, A. D. 1896.

THOMAS DUNCAN.

Witnesses:
IDA L. ROSS-LEWIN,
SOPHIA L. SCHWARZE.